United States Patent [19]
Goodhart et al.

[11] 3,791,222
[45] Feb. 12, 1974

[54] DISSOLUTION TESTING DEVICE

[75] Inventors: Frank Goodhart, Morristown; William A. Campbell, Chester, both of N.J.

[73] Assignee: Warner-Lambert Company, Morris Plains, N.J.

[22] Filed: Apr. 7, 1972

[21] Appl. No.: 242,170

[52] U.S. Cl. .................. 73/432 R, 23/253 R, 73/53
[51] Int. Cl. ............................................... B01f 1/00
[58] Field of Search .... 73/432 R, 53; 356/196, 197; 23/230 B, 253 R, 259 R

[56] References Cited
UNITED STATES PATENTS
3,223,486  12/1965  Holl, Jr. et al. ............... 23/259 R X
3,192,774  7/1965  Simoons ............................ 73/53 X
3,545,864  12/1970  Dibbern ............................ 73/53 X
3,618,395  11/1971  Melliger .......................... 73/432 R Primary Examiner—Richard C. Queisser
Assistant Examiner—Joseph W. Roskos
Attorney, Agent, or Firm—James F. Powers, Jr.; Albert H. Graddis

[57] ABSTRACT

The specific disclosure provides a dissolution rate testing device for tablets and capsules comprising a closed chamber having a solution medium therein, a removable holder positioned in the bottom of the chamber for at least one tablet or capsule, and an impeller for circulating the solution medium about the at least one tablet or capsule so that the dissolution rate can be observed.

7 Claims, 5 Drawing Figures

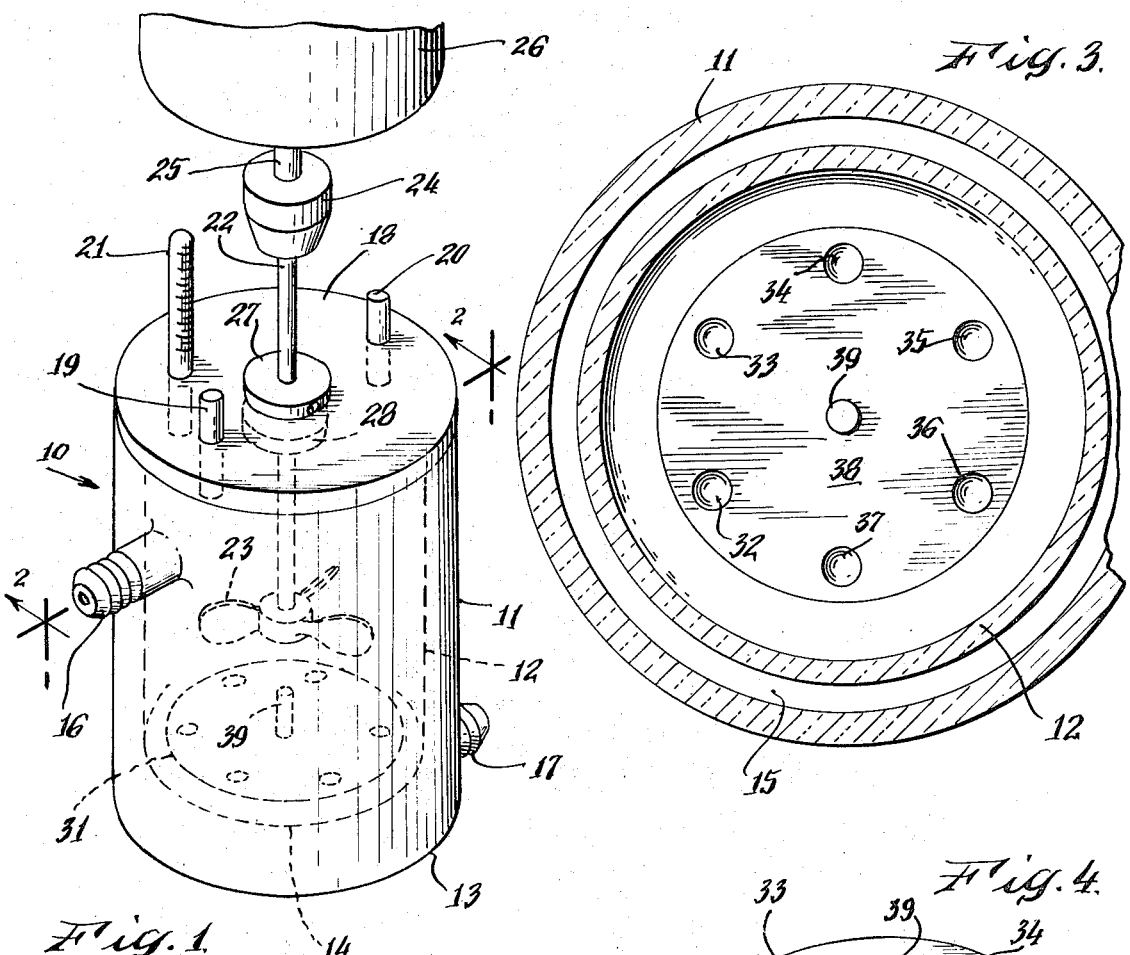
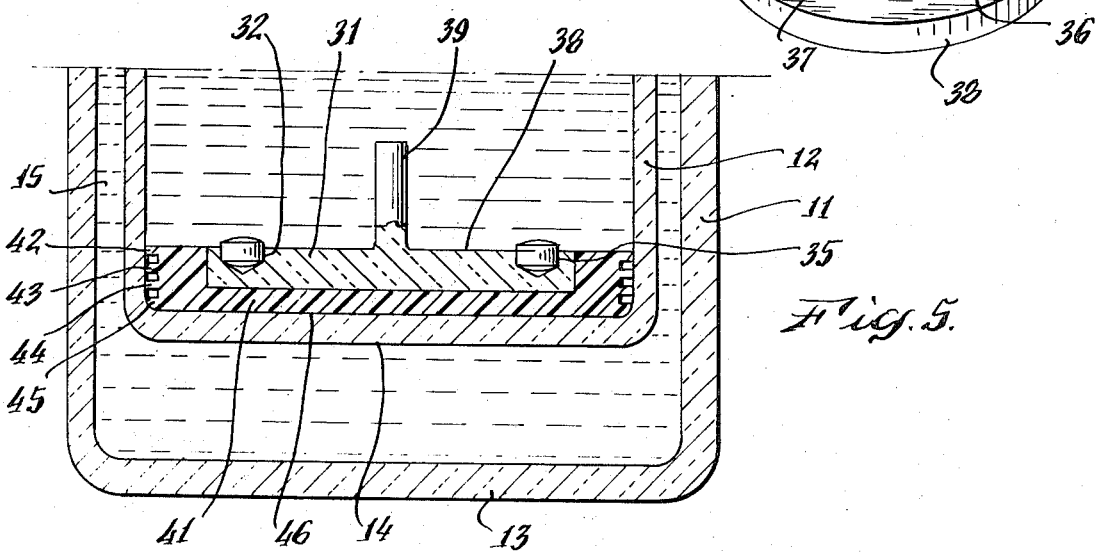

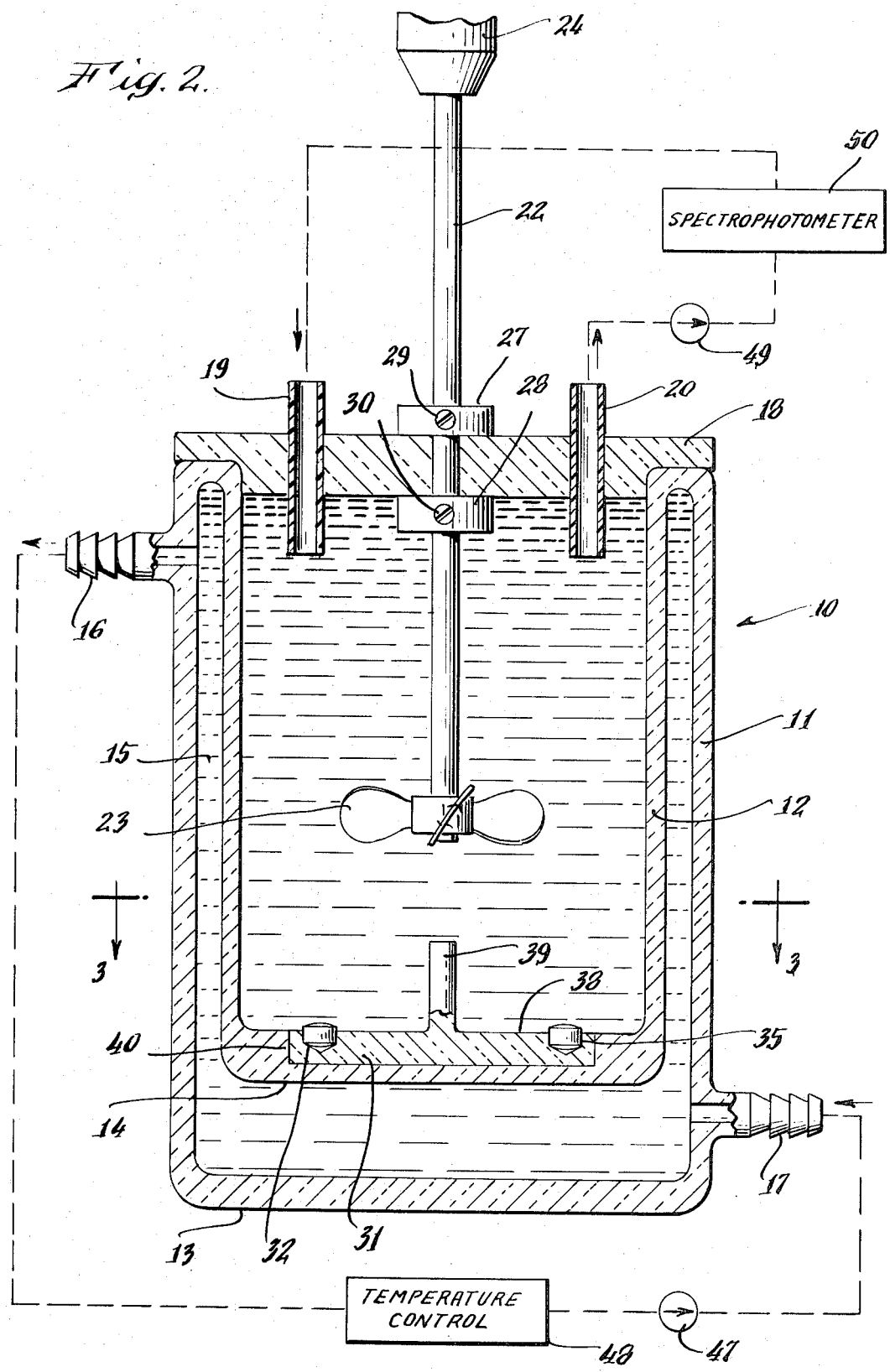

DISSOLUTION TESTING DEVICE

BACKGROUND OF THE INVENTION

1. Field of the Invention

The present invention relates to a system for determining dissolution rates of tablets and capsules. More particularly, the present invention relates to a system for determining the dissolution rate of tablet and capsule dosage forms containing relatively insoluble drugs.

2. DESCRIPTION OF THE PRIOR ART

In the production of dosage forms of therapeutic compositions such as tablets and capsules, it is of importance as one aspect of quality control to produce these products with uniform dissolution characteristics so that reliable absorption rates and effective blood levels of the active therapeutic ingredients can be achieved and maintained. Various factors can affect the dissolution characteristics of tablets and capsules. For example, in the case of tablets, not only the excipients used but also the pressures under which the tablets are formed are of importance. Reliable means for testing the dissolution rates are necessary so that any undesirable variations and compressive force, for example, can be altered before excessive numbers of off-standard tablets are produced. The problem of determining dissolution characteristics is particularly difficult when the tablet or capsule contains relatively insoluble drugs.

SUMMARY OF THE INVENTION

It is an important object of this invention to provide a dissolution rate testing system with parts which are readily interchangeable for use with different size tablets and/or capsules and which can be used with various solvents and at variable temperatures.

Another object of this invention is to provide a dissolution rate testing device system wherein the progress of the entire test procedure is completely visible to the test operator and from which test samples of the solution may be withdrawn as needed.

Still another object of this invention is to provide a dissolution rate testing system wherein the progress of the entire test procedure is continuously monitored by continuously withdrawing samples of solution.

Yet another object of this invention is to provide a dissolution rate testing system wherein the various test parameters utilized can be modified as required for the particular tablet or capsule being tested.

In accordance with the present invention, there is provided a dissolution rate testing device for tablets and capsules comprising a closed chamber for a solution medium, and a passageway about the periphery of the container through which a fluid flows. Means is connected to the passageway for controlling the temperature of the fluid. A removable holder is positioned at the bottom of the container, and has an upwardly extending member for manually removing the holder from the container. The holder also has at least one hole in the upper side thereof for at least one tablet or capsule. A shaft extends vertically through the top of the container, and has an impeller at the lower end thereof for agitating the solution medium above the holder. Motive means is operatively connected to the top of the shaft.

Other aspects and objects of the present invention will become apparent from the following detailed description.

BRIEF DESCRIPTION OF THE DRAWINGS

FIG. 1 is a view in perspective of an embodiment of a dissolution rate testing device in accordance with this invention showing the removable holder in position in a jacketed closed chamber, and an impeller for circulating the solution medium;

FIG. 2 is a sectional view of the testing device taken along line 2—2 in FIG. 1;

FIG. 3 is a cross-sectional view of the testing device taken along the line 3—3 of FIG. 2;

FIG. 4 is a view in perspective of the holder employed for maintaining the tablets or capsules in fixed relation to the impeller; and FIG. 5 shows in cross-section another embodiment for the lower portion of the test chamber and holder.

DESCRIPTION OF SPECIFIC EMBODIMENTS

FIG. 1 shows a specific embodiment of the present invention having a transparent jacketed beaker 10. The jacketed beaker 10 has an outer wall portion 11 and an inner chamber 12. The outer wall portion 11 and the inner chamber 12 are each closed at their respective bottoms 13, 14 to provide a temperature controlling jacket chamber 15 about the side walls and bottom of the inner chamber 12. The outer wall portion 11 of the transparent jacket beaker 10 has an inlet 17 and an outlet 16 in fluid communication with the temperature controlling jacket chamber 15. A fluid such as water is passed through the jacket chamber 15 from the inlet 17 to the outlet 16 at a rate sufficient to maintain the inner chamber 12 at a desired temperature.

A cover 18 encloses the top of the jacket beaker 10 to prevent passage of fluid between the inner chamber 12 and the jacket chamber 15, and to prevent escape of fluids to the atmosphere. The cover 18 has ports formed therein for inlet and outlet conduits 19, 20 and for a thermometer 21. The inlet and outlet conduits 19, 20 are provided to permit periodic or continuous sampling of the contents of the inner chamber 12, and the thermometer 21 provides means for determining and monitoring the temperature of the inner chamber 12.

The cover 18 also has a port therethrough for an impeller shaft 22 which has an impeller 23 at the lower end thereof in the inner chamber 12. The shaft 22 is connected at its upper end to a coupling 24 which in turn is connected by a drive shaft 25 to a motor 26.

As shown in FIG. 2, the shaft 22 has thereabout an upper collar 27 and a lower collar 28. Each of the collars 27, 28 has set screws 29, 30 therethrough. The collars 27, 28 are situated in an abutting manner with respect to the top and the bottom of the cover 18 and the set screws 29, 30 are tightened to thus fix the position of the shaft 22 with respect to the cover 18. By thus fixing the relative position of the shaft 22 with respect to the cover 18, the relative height of the impeller 23 is fixed in the inner chamber 12.

The device of the present invention also includes a tablet or capsule holder 31 shown in perspective in FIG. 4. The holder 31 has six tablet or capsule holes 32-37 formed in the upper side of a disc 38. The holder also includes a vertically rising stem 39. As shown in FIG. 2, the bottom 14 of the inner chamber 12 has a circular cut out portion 40. The cut out portion 40 has a diameter of sufficient length to provide a close fit for the disc 38 of the holder 31 when it is fitted therein.

FIG. 5 shows an alternative embodiment for providing a suitable base at the lower end of the inner chamber 12 to accommodate the holder 31. With reference to FIG. 5, an insert 41 is positioned at the bottom of the inner chamber 12, and has a plurality of ribs 42–45 formed about the outer periphery thereof for frictionally engaging the side walls of the inner chamber 12 and thus provide a fluid-tight seal. The insert 41 also has a bore 46 formed in the upper side thereof to accommodate the holder 31.

With reference to FIG. 2, a solution medium or buffer is placed in the inner chamber 12, and the cover 18 is frictionally secured to the top of the jacketed beaker 10. A fluid such as water is pumped through the jacket chamber 15 by means of a pump 47 through a temperature control unit 48 which may heat or cool the fluid. The fluid such as water is passed through the jacket chamber 15 until a predetermined temperature of the solution medium or buffer is indicated on the thermometer 21 (FIG. 1). At this time, the cover 18 is removed and the holder 31 having one or a plurality of tablets or capsules from a particular lot is fitted in the bottom of the inner chamber 12. The cover 18 is then replaced. The impeller 23 which is at a predetermined height above the holder 31 is then rotated by actuation of the motor 26.

Since the jacketed beaker 10 is transparent, initial and complete breakdown of the tablets or capsules can be observed.

The rate of dissolution of the tablets or capsules can be determined by periodically sampling the solution in the inner chamber 12 through the outlet conduit 20, and analyzing the sample to determine the amount of at least one active therapeutic ingredient in the tablets or capsules. Alternatively, the rate of dissolution may be continuously determined by continuously withdrawing at a predetermined rate a portion of the solution through the outlet conduit 20 by a pump 49. The withdrawn solution is then passed to a monitoring device such as a spectrophotometer 50 and then returned to the inlet conduit 19. The spectrophotometer 50 is set to monitor a particular wave length for an active ingredient in the tablets or capsules and generates a signal representative of the monitored active ingredient which can be displayed on a strip chart to provide an absorbance versus time display of the dissolution rate of the tablets or capsules.

At the conclusion of each run, the system would be cleaned by flushing the inner chamber 12 and the conduits to the spectrophotometer 50 with a suitable solvent such as ethanol, and then flushing the inner chamber 12 and the conduits to the spectrophotometer 50 with water until a flat base line signal is generated by the spectrophotometer 50. Following flushing, the cover 18 is removed, and the holder 31 is removed by lifting the stem 39.

The same holder 31 may be used for the next test of tablets or capsules. Alternatively, a different holder having a different number of a different size of holes may be used for other tablets or capsules. Further, it is within the scope of the present invention to provide a holder having a single hole for a capsule or tablet centrally located therein and having the stem 39 positioned to one side thereof. It is also within the scope of the present invention to have the holder consist essentially of a stem, and having at least one tablet or capsule hole formed in the top of the stem.

The thus described system provides excellent reproducibility of dissolution rates. It is believed that the excellent reproducibility results from locating the tablets or capsules immediately below the impeller where they are in a position of maximum flow which is not hindered by any obstructions. Further, the system minimizes the need for supports or other protrusions, and thus maximizes cleaning by flushing to thus minimize the possibility of contamination. In addition, the impeller 23 can be precisely situated at a predetermined height above the tablets or capsules by adjustment of the collar 27. The collar 28 provides an additional function of supporting the cover 18 whenever the impeller 23, shaft 22 and motor 26 are lifted from the jacketed beaker 10.

By way of example, the jacketed beaker 10 can be a standard 600 ml beaker, and the holder 31 can be composed of an acrylic. Further by way of example, the insert 41 (FIG. 5) can be composed of layers of Teflon.

What is claimed is:

1. A device for determining dissolution rates of tablets or capsules comprising, in combination:
   a closed container for a solution medium,
   a passageway about the periphery of said container through which a fluid flows,
   means connected to said passageway for controlling the temperature of said fluid,
   a removable holder positioned within and at the bottom of said container, said holder comprising a centrally located upwardly extending elongated member for manually removing said holder from said container, and having at least one hole in the upper side thereof for said at least one tablet or capsule,
   a shaft extending vertically through the top of said container,
   an impeller at the lower end of said shaft for agitating said solution medium above said holder, and
   motive means operatively connected to the top of said shaft.

2. The device of claim 1, further comprising means for sampling said solution medium.

3. The device of claim 2 wherein said sampling means comprises conduit means for removing a sample of said solution at predetermined intervals.

4. The device of claim 2 wherein said sampling means comprises means for continuously sampling said solution at a predetermined rate.

5. The device of claim 4 further comprising means operatively connected to said sampling means for generating a signal representative of the amount of an active ingredient in said at least one tablet or capsule.

6. The device of claim 4 further comprising means operatively connected to said sampling means for generating a display representative of the rate of dissolution of said at least one tablet or capsule.

7. The device of claim 1 wherein said holder comprises a plurality of holes in the upper side thereof, said holes being spaced from said elongated member.

* * * * *